(12) United States Patent
Hao

(10) Patent No.: US 12,731,139 B2
(45) Date of Patent: Sep. 8, 2026

(54) TERMINAL AND AUTHENTICATION METHOD

(71) Applicant: NEC Corporation, Tokyo (JP)

(72) Inventor: Jia Hao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 277 days.

(21) Appl. No.: 18/373,700

(22) Filed: Sep. 27, 2023

(65) Prior Publication Data

US 2024/0112183 A1 Apr. 4, 2024

(30) Foreign Application Priority Data

Oct. 3, 2022 (JP) ................................ 2022-159319

(51) Int. Cl.

| | |
|---|---|
| ***G06Q 20/40*** | (2012.01) |
| ***G06Q 20/06*** | (2012.01) |
| ***G06Q 20/38*** | (2012.01) |
| ***H04L 9/08*** | (2006.01) |
| ***H04L 9/32*** | (2006.01) |

(52) U.S. Cl.

CPC ........... *G06Q 20/40* (2013.01); *G06Q 20/065* (2013.01); *G06Q 20/3825* (2013.01); *G06Q 20/3829* (2013.01); *H04L 9/0825* (2013.01); *H04L 9/3247* (2013.01)

(58) Field of Classification Search

CPC ........................... G06Q 20/3825; G06Q 20/40

See application file for complete search history.

(56) References Cited

U.S. PATENT DOCUMENTS

| | | | | |
|---|---|---|---|---|
| 2004/0066797 | A1 | 4/2004 | Shima | |
| 2005/0195814 | A1 | 9/2005 | Hagiwara et al. | |
| 2007/0078761 | A1 * | 4/2007 | Kagan | G06Q 20/322 705/39 |

(Continued)

FOREIGN PATENT DOCUMENTS

| | | | |
|---|---|---|---|
| JP | 2004-128894 | A | 4/2004 |
| JP | 2005-286989 | A | 10/2005 |

(Continued)

OTHER PUBLICATIONS

"Shi et al., Study on authentication technology of payment terminal based on USB key, Jan. 9, 2017, IEEE Xplore, entire document" (Year: 2017).*

(Continued)

*Primary Examiner* — Abhishek Vyas
*Assistant Examiner* — Adam Hilmantel
(74) *Attorney, Agent, or Firm* — Sughrue Mion, PLLC

(57) ABSTRACT

A terminal according to one aspect includes: at least one memory configured to store an instruction; and at least one processor configured to perform the instruction, wherein the at least one processor performs the instruction, and thus provides an electronic signature to data by using a secret key of an own terminal, provides, as an authentication request to another terminal, the data provided with the electronic signature, acquires, from the another terminal, an authentication result of an authentication server for the authentication request, the authentication result being encoded by using a public key of the own terminal, and decodes the authentication result by using the secret key of the own terminal.

17 Claims, 13 Drawing Sheets

(56) References Cited

U.S. PATENT DOCUMENTS

| | | | | |
|---|---|---|---|---|
| 2014/0289531 | A1 | 9/2014 | Yamakawa | |
| 2018/0013853 | A1 | 1/2018 | Takahashi et al. | |
| 2020/0211003 | A1 | 7/2020 | Fletcher | |
| 2020/0213085 | A1 | 7/2020 | Fletcher | |
| 2022/0141036 | A1 * | 5/2022 | Jang | H04L 9/0825 713/176 |
| 2023/0289788 | A1 | 9/2023 | Fletcher | |
| 2024/0265384 | A1 | 8/2024 | Fletcher | |
| 2025/0021971 | A1 | 1/2025 | Fletcher | |

FOREIGN PATENT DOCUMENTS

| | | | | | |
|---|---|---|---|---|---|
| JP | 2010-045668 | A | | 2/2010 | |
| JP | 2014-183442 | A | | 9/2014 | |
| JP | 2018-010370 | A | | 1/2018 | |
| JP | 2020-523839 | A | | 8/2020 | |
| JP | 2022144156 | A | * | 10/2022 | |
| WO | 2009/060899 | A1 | | 5/2009 | |
| WO | WO-2023046409 | A1 | * | 3/2023 | H04L 9/3255 |

OTHER PUBLICATIONS

Japanese Office Action for JP Application No. 2022-159319, mailed on Jul. 28, 2026 with English Translation.

* cited by examiner

TERMINAL AND AUTHENTICATION METHOD

INCORPORATION BY REFERENCE

This application is based upon and claims the benefit of priority from Japanese patent application No. 2022-159319, filed on Oct. 3, 2022, the disclosure of which is incorporated herein in its entirety by reference.

TECHNICAL FIELD

The present disclosure relates to a terminal and an authentication system.

BACKGROUND ART

Various techniques for performing authentication processing between a server and a terminal are disclosed. For example, International Patent Publication No. WO 2009/060899 discloses a common key setting method for setting a common key by a first device and a second device via a relay device in order to perform encoding communication via the relay device.

SUMMARY

There is a conceivable case where, even when a terminal tries to access a server for authentication processing, the terminal cannot access the server due to a problem of the terminal or a network. In this case, the terminal needs to perform the authentication processing with the server via another terminal. International Patent Publication No. WO 2009/060899 do not disclose such a technique.

One example of an object to be achieved by example embodiments of the present disclosure is to provide a terminal and an authentication system that are able to perform authentication processing by a plurality of terminals in cooperation with each other. It should be noted that this object is merely one of a plurality of objects to be achieved by the plurality of example embodiments disclosed herein. The other objects or problems and a new characteristic will become apparent from the description of the present specification and the accompanying drawings.

A terminal according to one aspect includes at least one memory configured to store an instruction, and at least one processor configured to perform the instruction. The processor performs the instruction, and thus provides a first electronic signature to data by using a secret key of an own terminal, provides, as an authentication request to another terminal, the data provided with the first electronic signature, acquires, from the another terminal, an authentication result of an authentication server for the authentication request, the authentication result being encoded by using a public key of the own terminal, and decodes the authentication result by using the secret key of the own terminal.

A terminal according to another aspect includes at least one memory configured to store an instruction, and at least one processor configured to perform the instruction. The processor performs the instruction, and thus acquires data provided with a first electronic signature by another terminal, verifies the first electronic signature by using a public key of the another terminal, transmits the verified data as an authentication request to an authentication server, receives an authentication result for the authentication request from the authentication server, provides a second electronic signature to the authentication result by using a secret key of an own terminal, and provides the authentication result provided with the second electronic signature to the another terminal.

An authentication system according to one aspect includes a first terminal and a second terminal. The first terminal includes at least one first memory configured to store a first instruction, and at least one first processor configured to perform the first instruction. The first processor performs the first instruction, and thus provides a first electronic signature to data by using a secret key of the first terminal. The second terminal includes at least one second memory configured to store a second instruction, and at least one second processor configured to perform the second instruction. The second processor performs the second instruction, and thus acquires the data provided with the first electronic signature, verifies the first electronic signature by using a public key of the first terminal, transmits the verified data as an authentication request to an authentication server, and receives, from the authentication server, an authentication result for the authentication request, the authentication result being encoded by using the public key of the first terminal. The first processor performs the first instruction, and thus acquires the authentication result from the second terminal, and decodes the acquired authentication result by using the secret key of the first terminal.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENT

Each example embodiment will be described below with reference to the drawings. Note that, for clarification of the description, the description and the drawings below are appropriately omitted and simplified. Further, in the present disclosure, when "at least any of" a plurality of items is defined, the definition may indicate any one item, or may indicate any of the plurality of items (including all of the items) unless otherwise specified. Further, it is needless to say that a whole or any part of a configuration described in each example embodiment can be appropriately applied to a device and the like described in another example embodiment. Similarly, the drawings referred for description in each example embodiment can also be applied to another example embodiment.

First Example Embodiment

Figure 1:
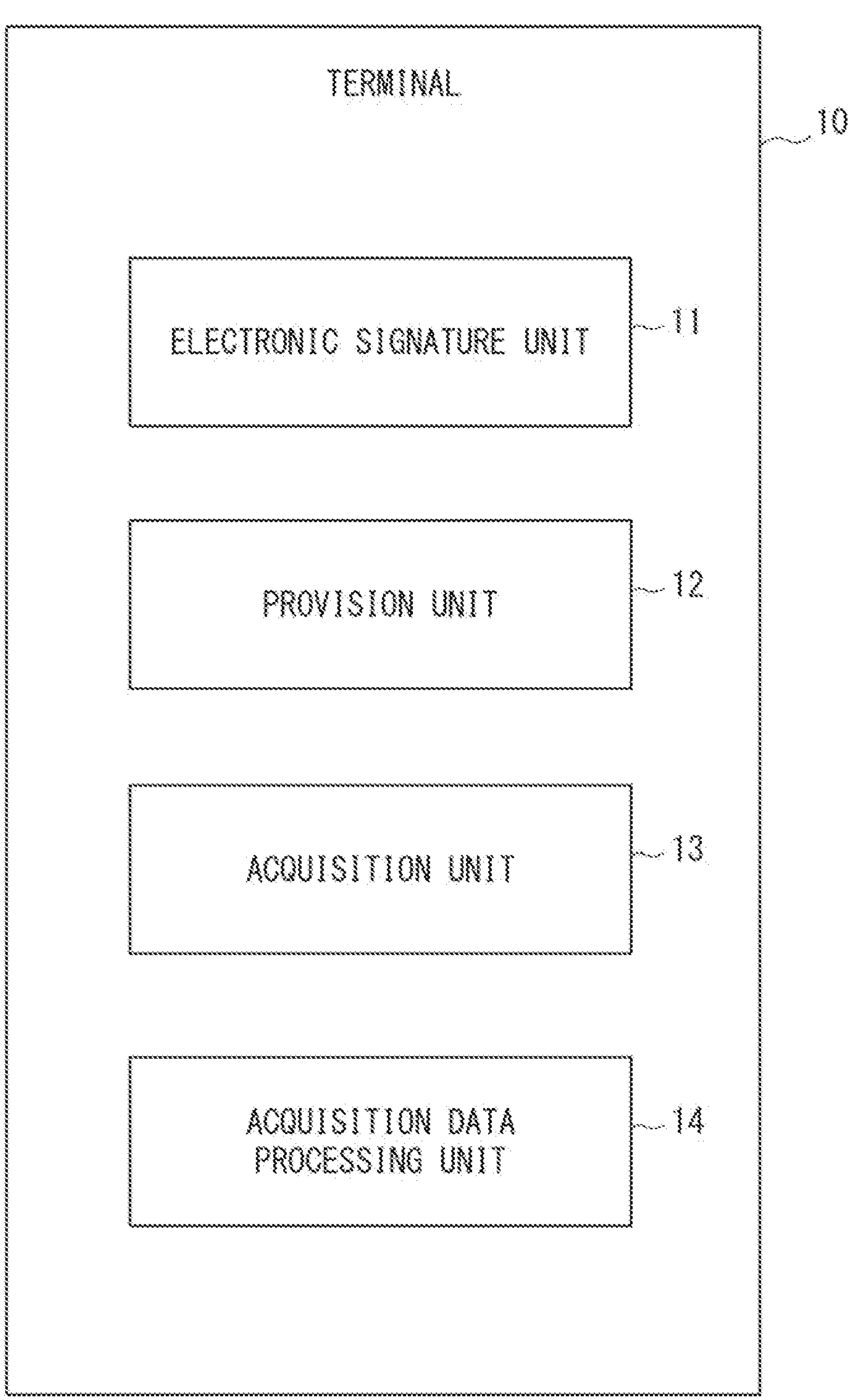
FIG. 1 is a block diagram illustrating one example of a terminal according to the present disclosure.

FIG. 1 is a block diagram illustrating one example of a terminal. A terminal 10 includes an electronic signature unit 11, a provision unit 12, an acquisition unit 13, and an acquisition data processing unit 14. The terminal 10 is a portable terminal such as a smartphone, and a computer of any kind such as a personal computer (PC). Each unit (each means) of the terminal 10 is controlled by a control unit (controller) that is not illustrated. Hereinafter, each unit of the terminal 10 will be described. Note that a configuration and processing described below are exemplifications, which are not limited thereto.

The electronic signature unit 11 provides an electronic signature (first electronic signature) to data being an authentication request target by using a secret key of the terminal 10. The electronic signature unit 11 can use any method using a public key and a secret key when the electronic signature unit 11 generates the electronic signature. Examples of the method include a Rivest-Shamir-Adleman (RSA) encryption method, a digital signature algorithm (DSA) signature method, and an elliptic curve digital signature algorithm (ECDSA) signature method. For example, when the RSA encryption method is used, the electronic signature unit 11 converts data into a hash value by a hash function, and then encodes the data by using a secret key. Further, as one example, the electronic signature unit 11 may generate an electronic signature by generating, by a secret key, an encoded characteristic (digest) of a document being a target to be provided to another terminal or a device.

The provision unit 12 provides, as an authentication request to another terminal, the data provided with the electronic signature by the electronic signature unit 11. The provision unit 12 may include, for example, an interface (wireless communication unit) of wireless communication. The interface of wireless communication may be an interface of wireless communication of any kind between a base station and a portable terminal, such as 5th generation (5G), long term evolution (LTE), and Beyond 5G. Further, as another example, the interface of wireless communication may be an interface of wireless communication that performs short-range wireless communication with a terminal or a device located near the terminal 10, such as a wireless local area network (LAN), Bluetooth (registered trademark), infrared communication, and near field communication (NFC). Note that Bluetooth may also include an expansion technique of Bluetooth such as Bluetooth low energy (BLE). A specific example of wireless LAN is, for example, WiFi (registered trademark). When the provision unit 12 performs short-range wireless communication, the provision unit 12 can directly transmit data to another terminal without the data passing through a base station and the like. The another terminal receives the authentication request by using an interface of wireless communication of the another terminal. However, the terminal 10 may be connected to another terminal via a plurality of connection apparatuses by mesh network connection, and the provision unit 12 may provide the above-described information to the another terminal via a mesh network. Further, the provision unit 12 may be an interface of wired communication.

As another example, the provision unit 12 may include a display unit of data. In this case, the provision unit 12 being the display unit processes, by using software, data in such a way that the data can be acquired by another terminal, and then displays the data. For example, the provision unit 12 may display data by a code in any form such as a one-dimensional code or a two-dimensional code. A QR code (registered trademark) being a two-dimensional code is taken as an example of a code to be used, but the example of the code is not limited to this. Another terminal acquires an authentication request by acquiring an image displayed on the provision unit 12 by, for example, a camera included in the another terminal.

The another terminal transmits the acquired authentication request to an authentication server that judges the authentication request. The authentication server judges the received authentication request, and transmits an authentication result being a result of the judgment to the another terminal. At this time, the authentication server encodes the authentication result by using a public key of the terminal 10 in such a way that the authentication result cannot be read by a terminal other than the terminal 10, and transmits the encoded authentication result to the another terminal.

The acquisition unit 13 acquires the encoded authentication result from the another terminal. The acquisition unit 13 may be, for example, an interface (wireless communication unit) of wireless communication. The interface of wireless communication may be an interface of wireless communication of any kind between a base station and a portable terminal, such as 5G, LTE, and Beyond 5G, and may be an interface of wireless communication that performs short-range wireless communication such as a wireless LAN (for example, WiFi), Bluetooth, and infrared communication. When the acquisition unit 13 performs short-range wireless communication, the acquisition unit 13 can directly receive an authentication result from another terminal without the authentication result passing through a base station and the like. However, the acquisition unit 13 may receive an authentication result from another terminal via a plurality of connection apparatuses by mesh network connection. Further, the acquisition unit 13 may be an interface of wired communication. When the acquisition unit 13 is an interface of wireless or wired communication, the provision unit 12 and the acquisition unit 13 may be formed of the same interface.

As another example, the acquisition unit 13 may be a camera. In this case, a display unit of another terminal displays data in a form in which the terminal 10 can acquire data about a displayed authentication result. The acquisition unit 13 captures the displayed data, and thus acquires an encoded authentication result.

The acquisition data processing unit 14 decodes, by using the secret key of the terminal 10, the authentication result acquired by the acquisition unit 13. In this way, the terminal 10 can confirm the authentication result.

Figure 2:
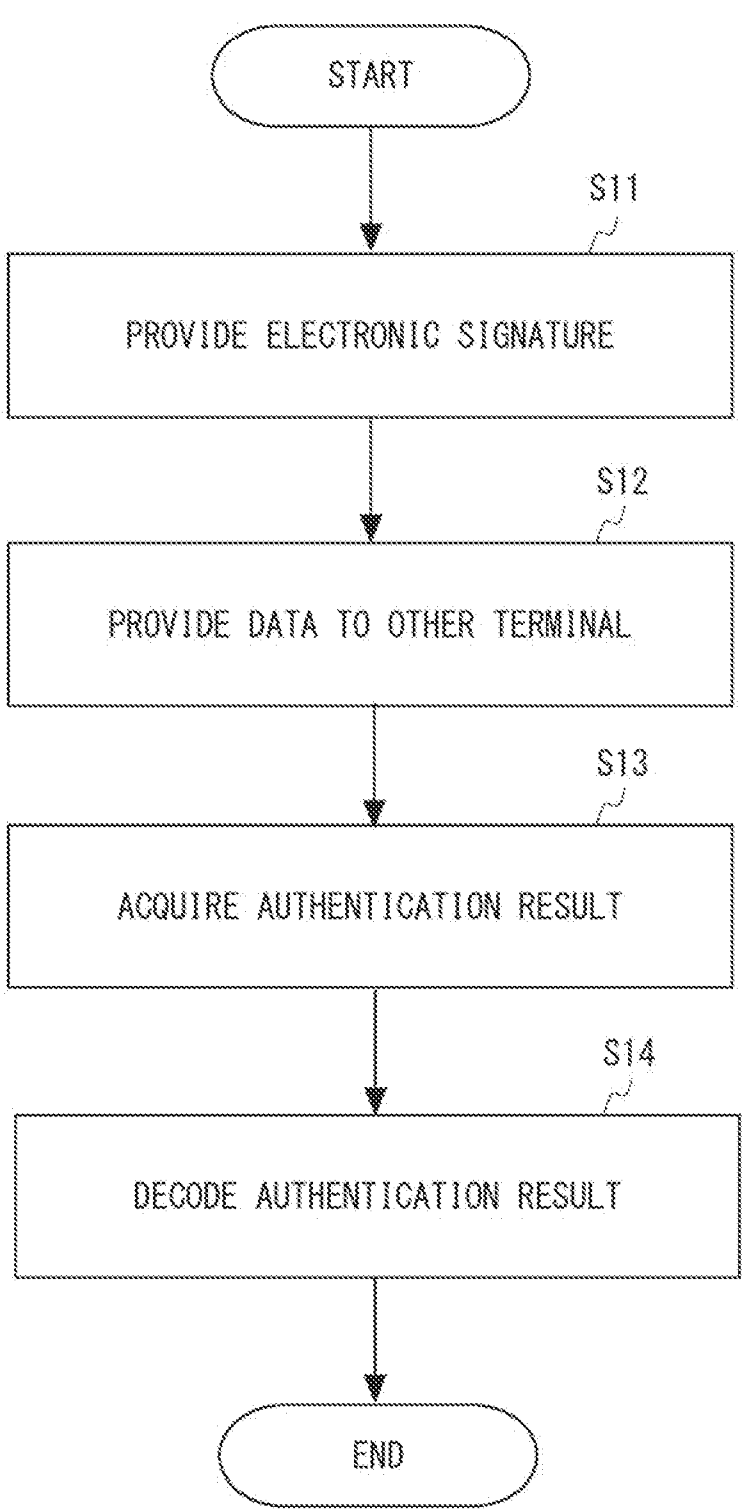
FIG. 2 is a flowchart illustrating one example of representative processing of the terminal according to the present disclosure.

FIG. 2 is a flowchart illustrating one example of representative processing of the terminal 10, and the processing of the terminal 10 is described with the flowchart. Note that details of each processing are as described above.

First, the electronic signature unit 11 of the terminal 10 provides an electronic signature to data by using a secret key of the terminal 10 (step S11: electronic signature step). Next, the provision unit 12 provides, as an authentication request to another terminal, the data provided with the electronic signature (step S12: provision step).

The acquisition unit 13 acquires, from the another terminal, an authentication result of an authentication server for the authentication request, the authentication result being encoded by using a public key of the terminal 10 (step S13: acquisition step). The acquisition data processing unit 14 decodes the authentication result by using the secret key of the terminal 10 (step S14: encoding step).

As described above, the terminal 10 transmits, to another terminal that can communicate with an authentication server, an authentication request including an electronic signature indicating that the terminal 10 has provided the signature. Further, an authentication result is confirmed by decoding the authentication result acquired from the authentication server via the another terminal. In this way, the terminal 10 can complete authentication processing in cooperation with the another terminal even when the terminal 10 cannot be connected to the authentication server.

Second Example Embodiment

Figure 3:
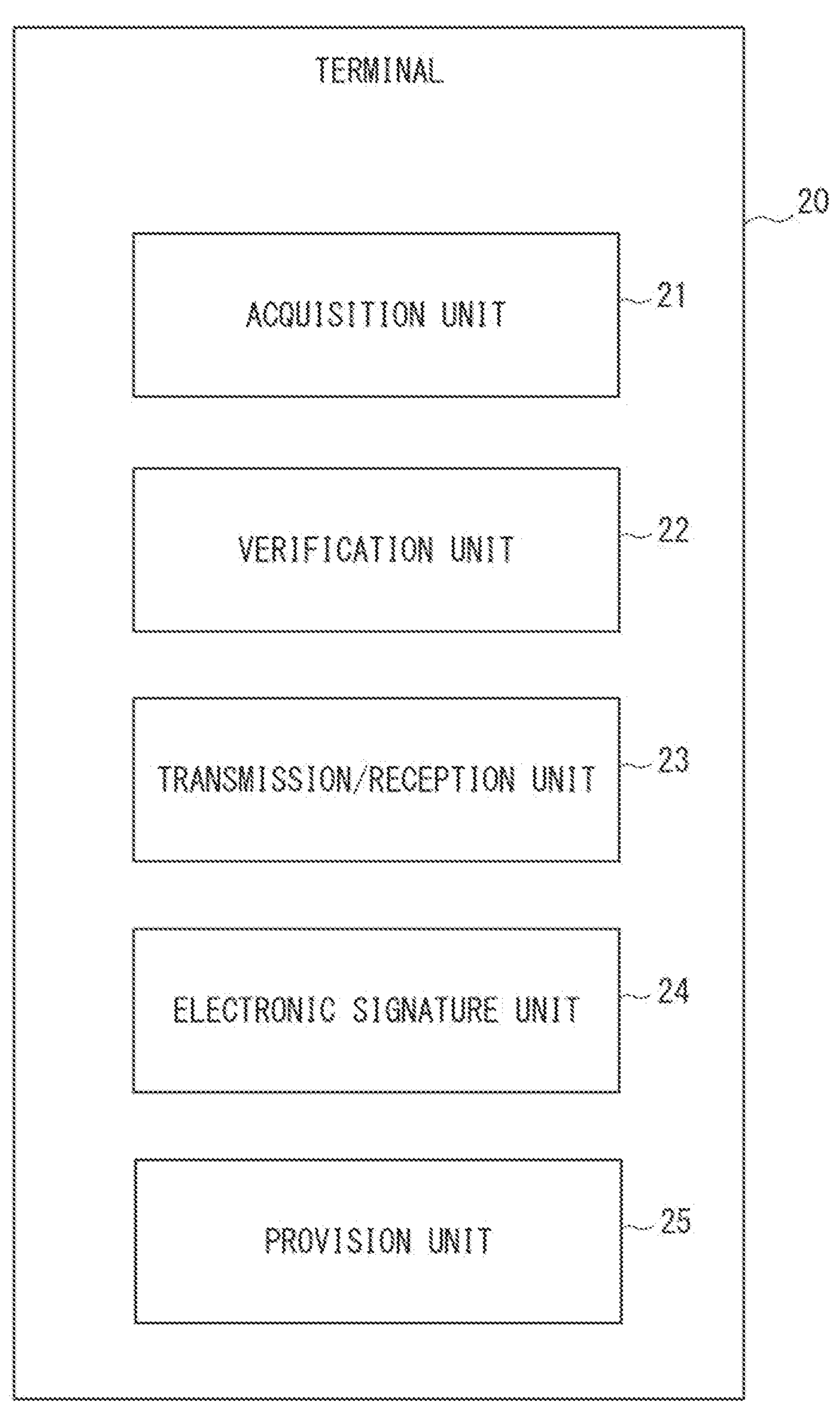
FIG. 3 is a block diagram illustrating one example of the terminal according to the present disclosure.

FIG. 3 is a block diagram illustrating a different example of a terminal. A terminal 20 includes an acquisition unit 21, a verification unit 22, a transmission/reception unit 23, an electronic signature unit 24, and a provision unit 25. The terminal 20 is a portable terminal such as a smartphone, and a computer of any kind such as a PC. Each unit (each means) of the terminal 20 is controlled by a control unit (controller) that is not illustrated. Hereinafter, each unit of the terminal 20 will be described. Note that a configuration and processing described below are exemplifications, which are not limited thereto.

The acquisition unit 21 acquires data provided with a first electronic signature by another terminal. The acquisition unit 21 may directly acquire data from the terminal that provides the first electronic signature, or may acquire the data via still another terminal or a device (for example, a base station). In the latter example, a case of connection with another terminal by mesh network connection is assumed.

The acquisition unit 21 may be, for example, an interface of wireless or wired communication, or a camera. In this way, the acquisition unit 21 has a configuration similar to that of the acquisition unit 13 according to the first example embodiment. Detailed description of the acquisition unit 21 is similar to that of the acquisition unit 13, and is thus omitted.

The verification unit 22 verifies the first electronic signature in the acquired data by using a public key of the another terminal. For example, when an electronic signature is generated by encoding a characteristic of a document by a secret key of another terminal, the verification unit 22 can confirm presence or absence of tampering by extracting the characteristic of the document from the electronic signature by using a public key of the another terminal, and comparing the characteristic with the document included in the acquired data. In this way, the verification unit 22 can confirm that the acquired data are from the another terminal.

The transmission/reception unit 23 transmits, as an authentication request to an authentication server, the data verified by the verification unit 22. The authentication server judges the received authentication request, and transmits an authentication result being a result of the judgment to the terminal 20. At this time, the authentication server may encode the authentication result in such a way that the authentication result cannot be read by a terminal other than the terminal in which the first electronic signature is provided, and transmit the encoded authentication result to the terminal 20. The transmission/reception unit 23 receives the authentication result for the authentication request from the authentication server. For example, the transmission/reception unit 23 may be an interface of wireless communication of any kind between a base station and a portable terminal, such as 5G, LTE, and Beyond 5G. Further, as another example, the transmission/reception unit 23 may be an interface of wired communication.

The electronic signature unit 24 provides, by using a secret key of the terminal 20, a second electronic signature to the authentication result received by the transmission/reception unit 23. In this way, another terminal that subsequently acquires the authentication result can recognize that the terminal 20 is involved in authentication processing (i.e., the authentication result is received from the authentication server).

The provision unit 25 provides the authentication result provided with the second electronic signature by the electronic signature unit 24 to the another terminal. The provision unit 25 may include an interface of wireless or wired communication, and may include a display unit of data. In this way, the provision unit 25 has a configuration similar to that of the provision unit 12 according to the first example embodiment. Detailed description of the provision unit 25 is similar to that of the provision unit 12, and is thus omitted.

Figure 4:
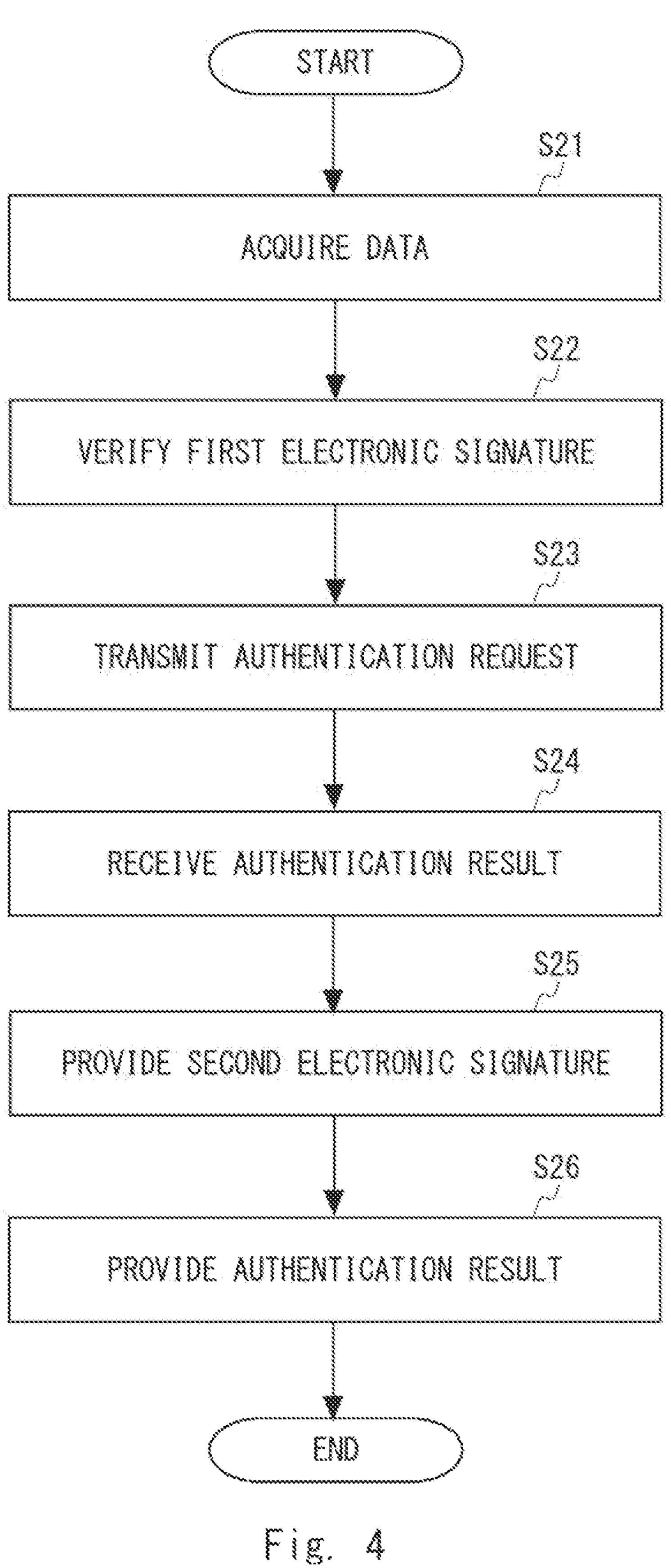
FIG. 4 is a flowchart illustrating one example of representative processing of the terminal according to the present disclosure.

FIG. 4 is a flowchart illustrating one example of representative processing of the terminal 20, and the processing of the terminal 20 is described with the flowchart. Note that details of each processing are as described above.

First, the acquisition unit 21 of the terminal 20 acquires data provided with a first electronic signature by another terminal (step S21: acquisition step). Next, the verification unit 22 verifies the first electronic signature by using a public key of the another terminal (step S22: verification step).

The transmission/reception unit 23 transmits the verified data as an authentication request to an authentication server (step S23: transmission step). Subsequently, the transmission/reception unit 23 receives an authentication result for the authentication request from the authentication server (step S24: reception step).

The electronic signature unit 24 provides a second electronic signature to the authentication result by using a secret key of the terminal 20 (step S25: signature step). The provision unit 25 provides, to the another terminal, the authentication result provided with the second electronic signature (step S26: provision step).

As described above, the terminal 20 verifies a first electronic signature of data, confirms that the data are output from another terminal, and then transmits the data as an authentication request to an authentication server. Further, the terminal 20 provides a second electronic signature to a received authentication result, and then provides the data to the another terminal. In this way, the another terminal can complete authentication processing in cooperation with the terminal 20 even when the another terminal cannot be connected to the authentication server. For example, the terminal 20 can function as another terminal according to the first example embodiment.

Third Example Embodiment

Figure 5:
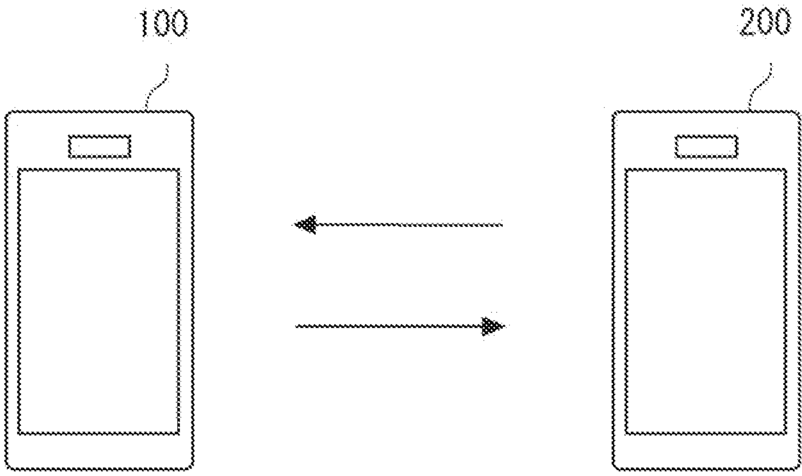
FIG. 5 is a schematic diagram illustrating one example of an authentication system according to the present disclosure.

FIG. 5 is a schematic diagram illustrating an example of an authentication system. An authentication system S1 includes terminals 100 and 200. However, the authentication system S1 may further include a terminal other than the terminals 100 and 200. Note that a configuration and processing described below are exemplifications, which are not limited thereto.

The terminals 100 and 200 each include a control unit (controller), and the control unit performs processing of each of the terminals. A specific example of a configuration of the terminal 100 is the terminal 10 illustrated in the first example embodiment, and a specific example of a configuration of the terminal 200 is the terminal 20 illustrated in the second example embodiment.

Figure 6:
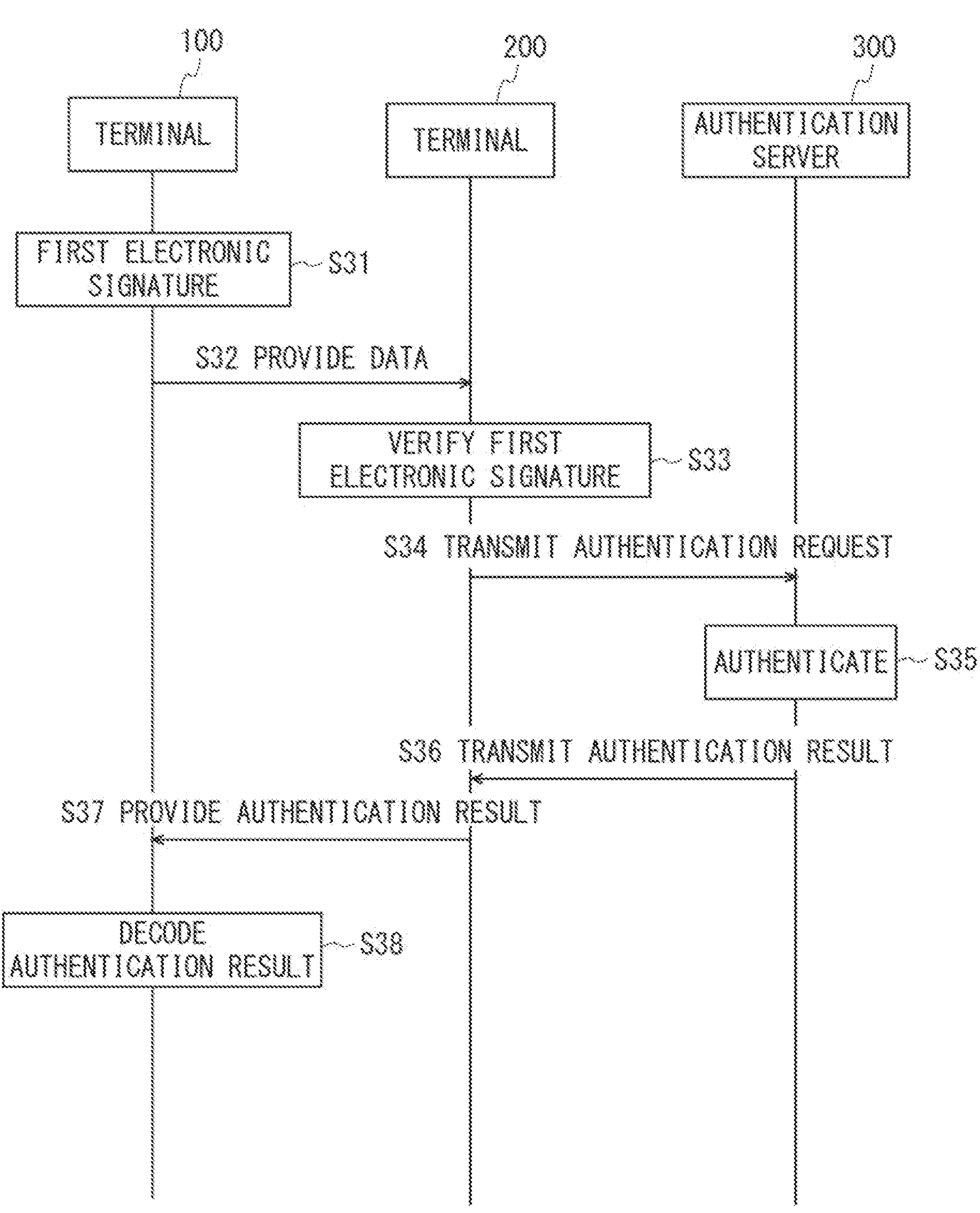
FIG. 6 is a sequence diagram illustrating a processing example of the authentication system according to the present disclosure.

FIG. 6 is a sequence diagram illustrating a processing example of the authentication system. FIG. 6 also illustrates, in addition to the terminals 100 and 200, an authentication server 300 connected to the terminal 200 for the sake of description. Hereinafter, a processing example of the authentication system S1 will be described by using FIG. 6.

First, the terminal 100 provides a first electronic signature to data being an authentication request target by using a secret key of the terminal 100 (step S31). The terminal 100 provides, to the terminal 200, the data provided with the first electronic signature (step S32).

The terminal 200 acquires the data provided with the first electronic signature, and verifies the first electronic signature by using a public key of the terminal 100 (step S33). The terminal 200 transmits the verified data as an authentication request to the authentication server 300 (step S34).

The authentication server 300 receives the authentication request, and performs authentication processing on the authentication request (step S35). The authentication server 300 encodes an authentication result by using the public key of the terminal 100, and transmits the encoded authentication result to the terminal 200 (step S36).

The terminal 200 receives the encoded authentication result from the authentication server 300. The terminal 200 provides the authentication result to the terminal 100 (step S37). The terminal 100 acquires the authentication result provided from the terminal 200, and decodes the authentication result by using the secret key of the terminal 100 (step S38).

Details of each processing of the terminals 100 and 200 are as described in each of the first and second example embodiments, and are thus omitted. In this way, the terminal 100 can complete authentication processing by cooperating with the terminal 200 even when the terminal 100 cannot be connected to the authentication server 300. In other words, the authentication system S1 forms a distributed system for the authentication processing.

Fourth Example Embodiment

Next, a fourth example embodiment will be described. In the fourth example embodiment, a specific example of the authentication system indicated in the third example embodiment is provided. Note that a configuration and processing described below are exemplifications, which are not limited thereto.

Figure 7:
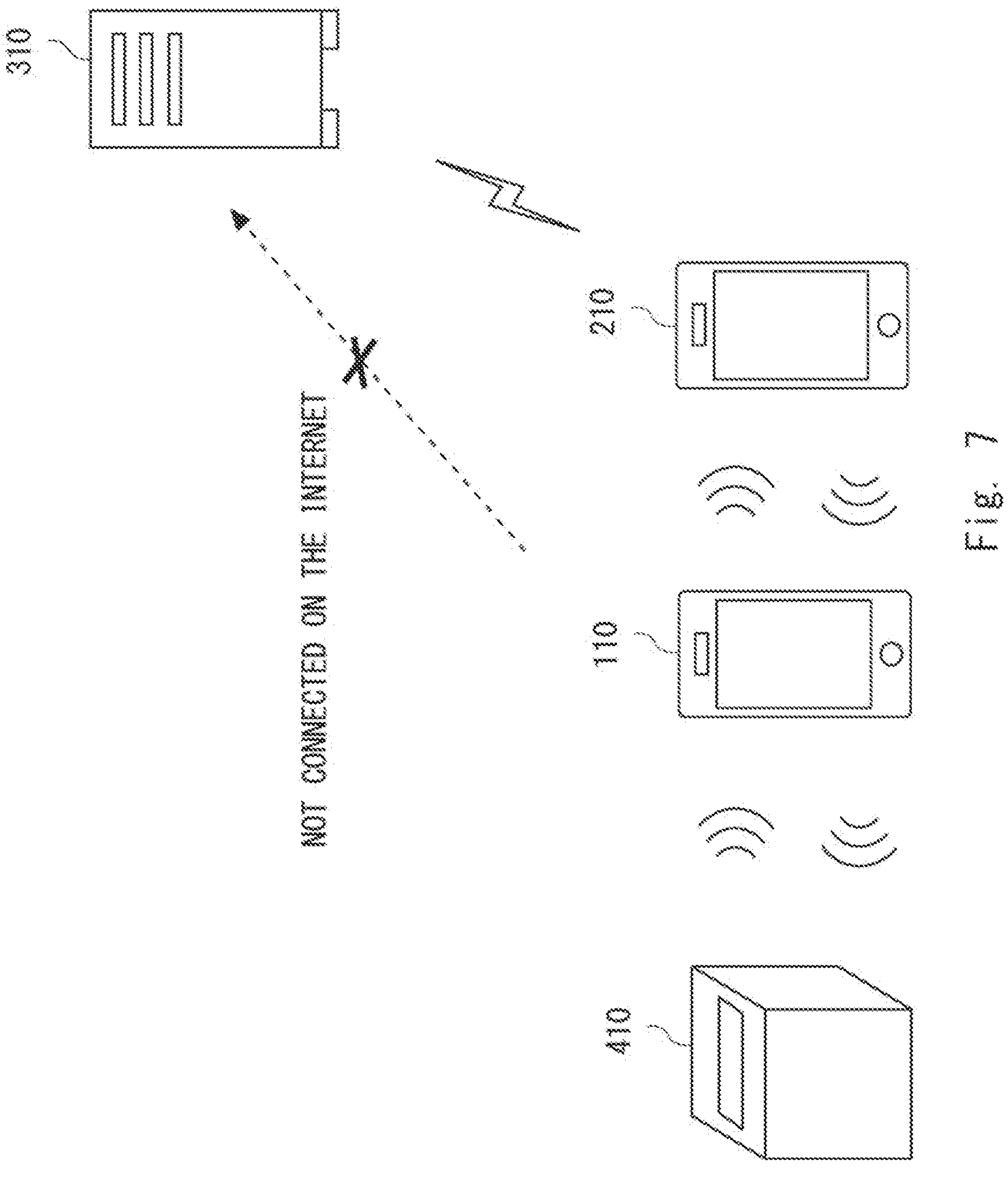
FIG. 7 is a schematic diagram illustrating one example of the authentication system according to the present disclosure.

FIG. 7 is a schematic diagram illustrating an example of an authentication system. An authentication system S2 includes an authentication server 310 and an automatic teller machine (ATM) 410 in addition to terminals 110 and 210. However, the authentication system S2 may further include a terminal other than the terminals 110 and 210.

The authentication system S2 can perform authentication processing in cryptocurrency (digital currency) of any kind. Herein, a case is assumed where, when the terminal 110 performs, in the ATM 410, a transaction for exchanging cryptocurrency of a user (hereinafter described as a user 1) of the terminal 110 with cash, authentication of the cryptocurrency possessed by the user 1 is needed. At this time, the terminal 110 cannot be connected on the Internet to the authentication server 310 that can perform the authentication, and the terminal 110 may not be able to directly acquire an authentication result from the authentication server 310. However, in the fourth example embodiment, as described below, the terminal 110 can acquire an authentication result via the terminal 210.

The terminals 110 and 210 in the authentication system S2 correspond to the specific examples of the terminals 100 and 200 in the authentication system S1, respectively. The terminals 110 and 210 are assumed to be a smartphone herein. Hereinafter, details of each device in the authentication system S2 will be described.

Figure 8A:
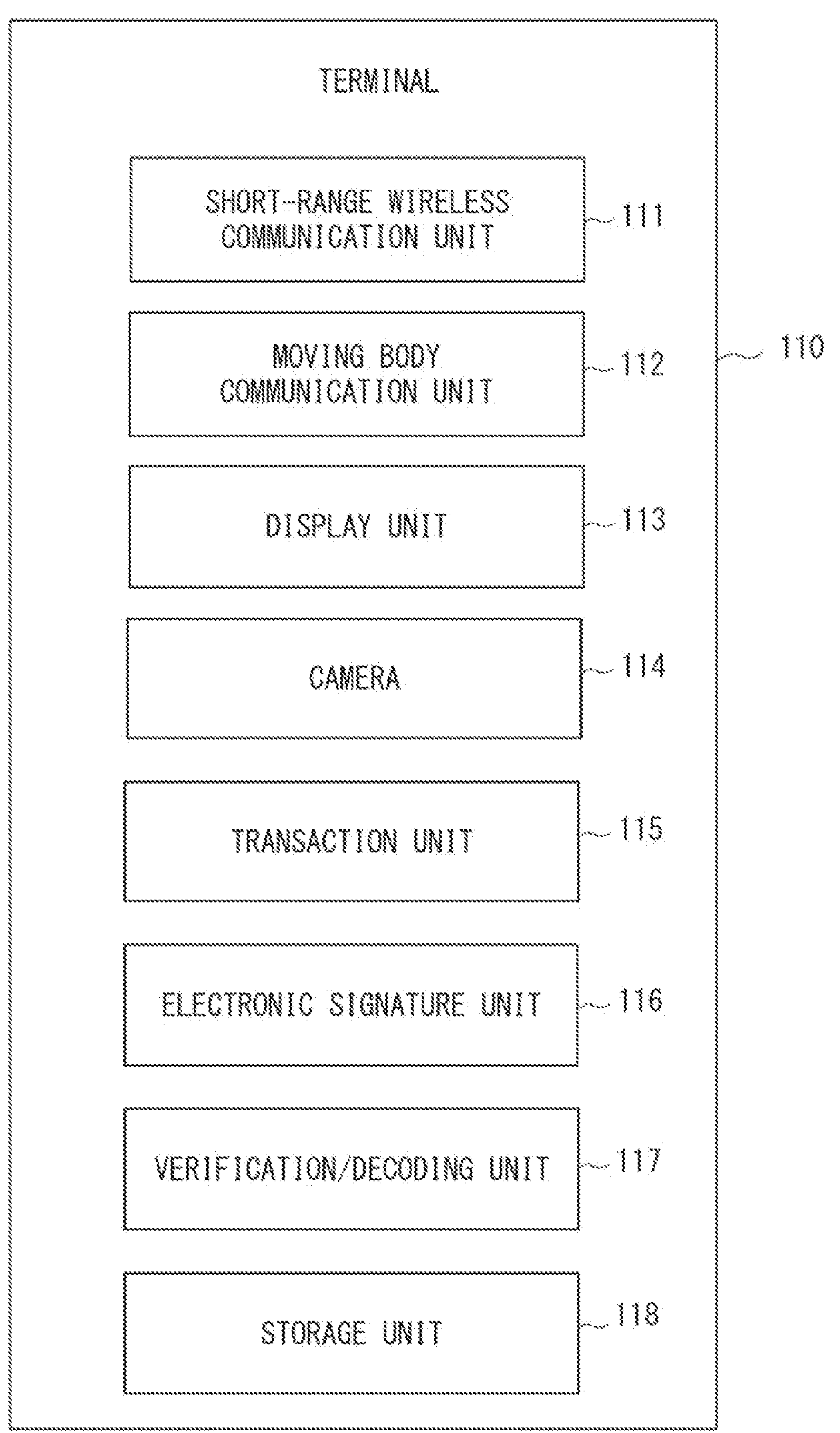
FIG. 8A is a block diagram illustrating one example of the terminal according to the present disclosure.
Figure 8B:
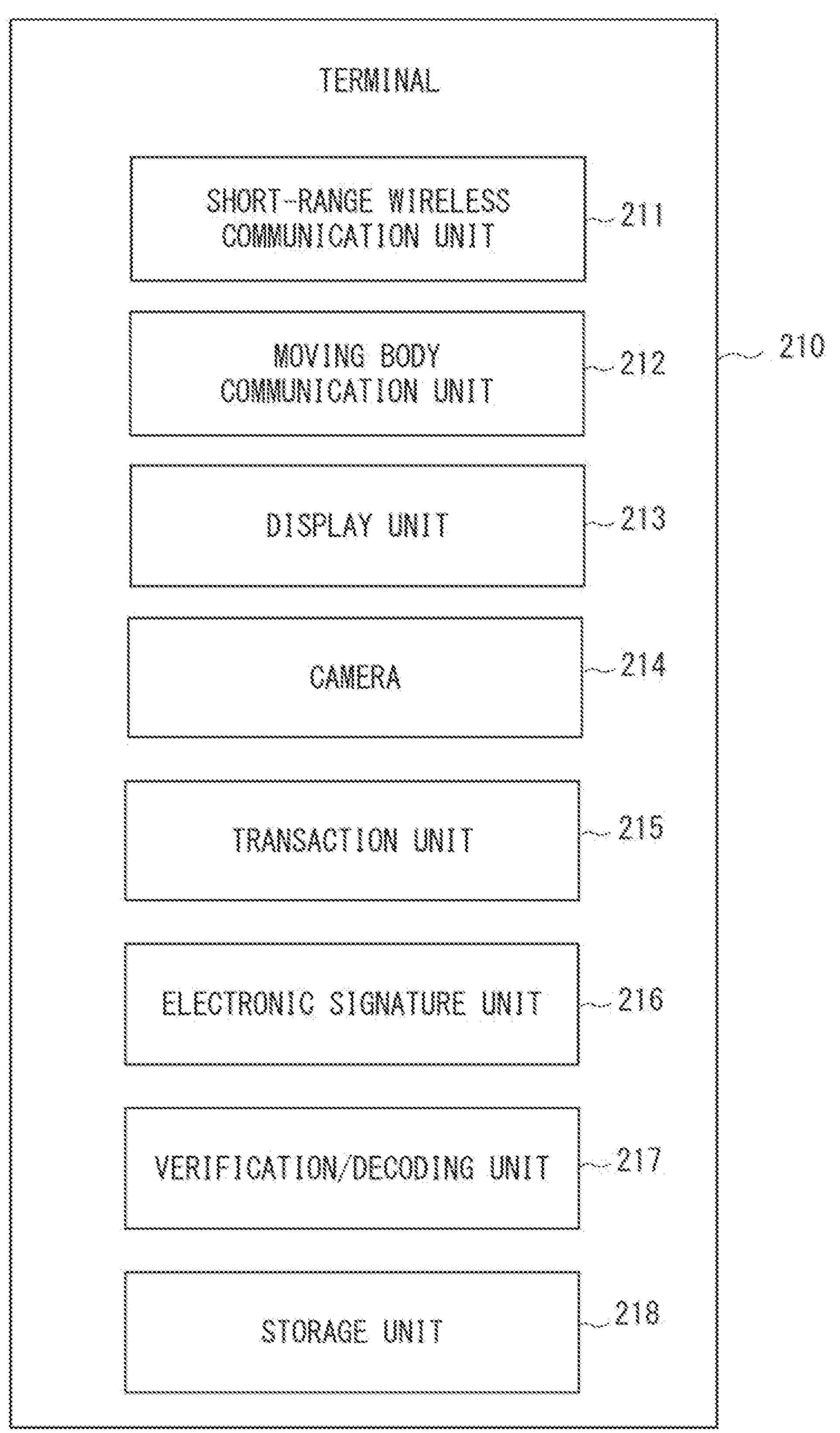
FIG. 8B is a block diagram illustrating one example of the terminal according to the present disclosure.

FIG. 8A is a block diagram illustrating one example of the terminal 110. The terminal 110 includes a short-range wireless communication unit 111, a moving body communication unit 112, a display unit 113, a camera 114, a transaction unit 115, an electronic signature unit 116, a verification/decoding unit 117, and a storage unit 118. Further, FIG. 8B is a block diagram illustrating one example of the terminal 210. The terminal 210 includes a short-range wireless communication unit 211, a moving body communication unit 212, a display unit 213, a camera 214, a transaction unit 215, an electronic signature unit 216, a verification/decoding unit 217, and a storage unit 218 that are components similar to those of the terminal 110. Hereinafter, each of the components of each of the terminals will be described.

The short-range wireless communication units 111 and 211 are an interface that performs terminal-to-terminal communication (device-to-device communication) between the terminal 110 and the terminal 210, and achieves transmission/reception of data between the terminals. In this example, the short-range wireless communication unit 111 uses WiFi as a short-range wireless communication technique between the terminals, but another short-range wireless communication technique such as Bluetooth may be used.

The moving body communication unit 112 is an interface that performs wireless communication between the terminal 110 and a base station, and the moving body communication unit 212 is an interface that performs wireless communication between the terminal 210 and a base station. However, in the fourth example embodiment, the moving body communication unit 112 cannot be connected to the authentication server 310. Thus, the moving body communication unit 212 of the terminal 210 performs connection to the authentication server 310 instead, and thus the authentication processing of the terminal 110 is performed.

The display units 113 and 213 include an interface that displays an operation screen for each user, such as a display or a touch panel. Further, the display units 113 and 213 also have a function of converting desired data of each terminal into a QR code by software, and displaying the QR code.

Examples of data converted into a QR code include data related to authentication processing of cryptocurrency.

The cameras 114 and 214 capture any video, and store information about the captured video in each of the terminals. For example, the camera 214 captures a QR code displayed by the display unit 113, and thus the terminal 210 can acquire data about the QR code. Similarly, the camera 114 captures a QR code displayed by the display unit 213, and thus the terminal 110 can acquire data about the QR code.

The transaction units 115 and 215 perform processing related to a transaction of cryptocurrency. For example, the transaction unit 115 can generate an authentication request to the authentication server 310 in order to acquire certification needed for a transaction of cryptocurrency. Further, the transaction unit 115 can perform processing needed for cryptocurrency by controlling the electronic signature unit 116, the verification/decoding unit 117, and the storage unit 118. The transaction unit 215 can also perform similar control on the electronic signature unit 216, the verification/decoding unit 217, and the storage unit 218.

The electronic signature unit 116 provides, by using a secret key of the terminal 110, an electronic signature to data acquired by the terminal 110 from the terminal 210 or another device. As described in the first example embodiment, any method using a public key and a secret key can be used for generating an electronic signature. Similarly, the electronic signature unit 216 provides, by using a secret key of the terminal 210, an electronic signature to data acquired by the terminal 210 from the terminal 110 or another device.

The verification/decoding unit 117 performs any processing of verification or decoding on data acquired by the terminal 110 from the terminal 210 or another device. For example, when acquired data are provided with an electronic signature of the terminal 210, the verification/decoding unit 117 verifies, by using a public key of the terminal 210, whether the electronic signature is really provided by the terminal 210. Further, when acquired data are encoded by a public key of the terminal 110, the verification/decoding unit 117 decodes the encoded data by using the secret key of the terminal 110.

Further, the verification/decoding unit 217 also performs processing similar to that of the verification/decoding unit 117. For example, when acquired data are provided with an electronic signature of the terminal 110, the verification/decoding unit 217 verifies, by using the public key of the terminal 110, whether the electronic signature is really provided by the terminal 110. Further, when acquired data are encoded by the public key of the terminal 210, the verification/decoding unit 217 can decode the encoded data by using the secret key of the terminal 210.

A wallet that stores data used for a transaction of cryptocurrency is present in the storage unit 118. Data used for a transaction of cryptocurrency include at least a public address being the public key of the terminal 110, and the secret key of the terminal 110 associated with the public address. The wallet is a mobile wallet in this example. However, when the terminal 110 is not a smartphone, the wallet may be a hot wallet of other kinds such as a desktop wallet or a cold wallet, for example. Cryptocurrency being a management target by the wallet is operated by any of a public type block chain and a consortium type block chain (federated block chain), for example. As a specific example of cryptocurrency operated by the public type block chain, Ethereum (registered trademark), Algo (registered trademark), and the like are associated. The electronic signature unit 116 and the verification/decoding unit 117 perform their own processing by using a secret key stored in the wallet. Similarly, the storage unit 218 also has a wallet that stores at least a public address being the public key of the terminal 210 and the secret key of the terminal 210 associated with the public address, and the electronic signature unit 216 and the verification/decoding unit 217 perform their own processing by using a secret key stored in the wallet.

Further, each of the terminals can also receive, by using the wallet, remuneration (commission related to authentication processing) for being involved in a transaction of cryptocurrency. Specifically, the terminal 210 acquires an authentication request of the terminal 110 related to authentication of cryptocurrency, and information about remuneration being set by the terminal 110 in relation to an authentication procedure. Subsequently, when the electronic signature unit 216 provides an electronic signature to the authentication request, a procedure of receiving at least a part of a remuneration amount presented from the terminal 110 is automatically performed by the wallet of the storage unit 218. In this example, cryptocurrency is Ethereum, and remuneration related to the authentication processing is GAS. However, a kind of remuneration is optional, and remuneration may be cash, a point, and the like.

Note that a correspondence between each unit of the terminal 10 and each unit of the terminal 110 is as follows. The electronic signature unit 11 corresponds to the electronic signature unit 116, and the provision unit 12 corresponds to the short-range wireless communication unit 111 or the display unit 113. The acquisition unit 13 corresponds to the short-range wireless communication unit 111 or the camera 114, and the acquisition data processing unit 14 corresponds to the verification/decoding unit 117.

Further, a correspondence between each unit of the terminal 20 and each unit of the terminal 210 is as follows. The acquisition unit 21 corresponds to the short-range wireless communication unit 211 or the camera 214, and the verification unit 22 corresponds to the verification/decoding unit 217. The transmission/reception unit 23 corresponds to the moving body communication unit 212, and the electronic signature unit 24 corresponds to the electronic signature unit 216. Further, the provision unit 25 corresponds to the short-range wireless communication unit 211 or the display unit 213.

Figure 9:
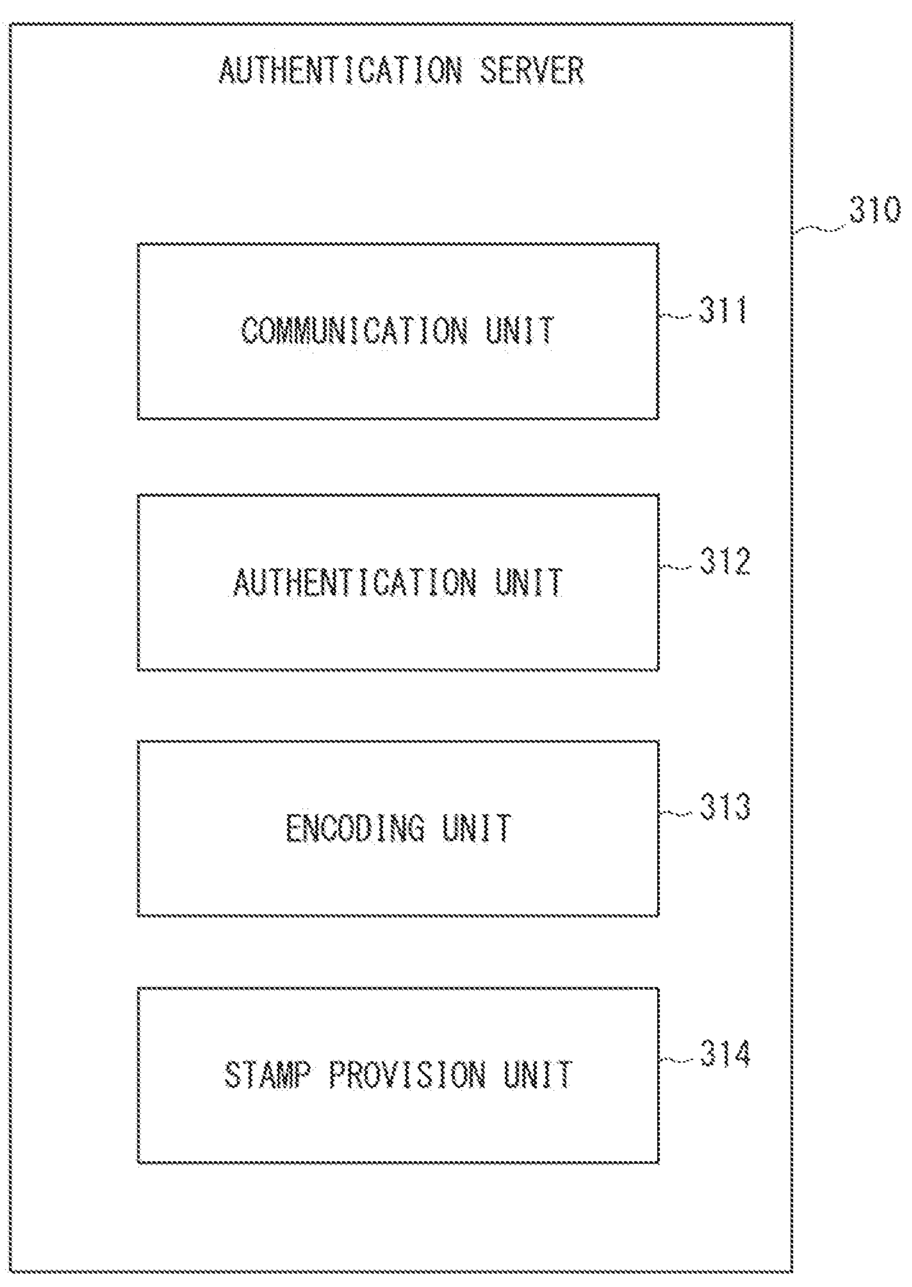
FIG. 9 is a block diagram illustrating one example of an authentication server according to the present disclosure.

FIG. 9 is a block diagram illustrating one example of the authentication server 310. The authentication server 310 includes a communication unit 311, an authentication unit 312, an encoding unit 313, and a stamp provision unit 314. Hereinafter, each of the components will be described.

The communication unit 311 is an interface that performs communication (transmission/reception of data) with an external device. In this example, the communication unit 311 is connected to the moving body communication unit 212 via the Internet.

The authentication unit 312 authenticates an authentication request from the terminal 110 being acquired from the communication unit 311, and generates an authentication result. The encoding unit 313 encodes the authentication result by using the public key of the terminal 110 in such a way that the authentication result cannot be read by a terminal other than the terminal 110. The stamp provision unit 314 suppresses tampering of information by providing a time stamp to the authentication result. The authentication result being encoded and provided with the time stamp in such a manner is transmitted from the communication unit 311 to the terminal 110 via the terminal 210. A technique of any known kind of a time stamp can be applied to the stamp provision unit 314.

Figure 10:
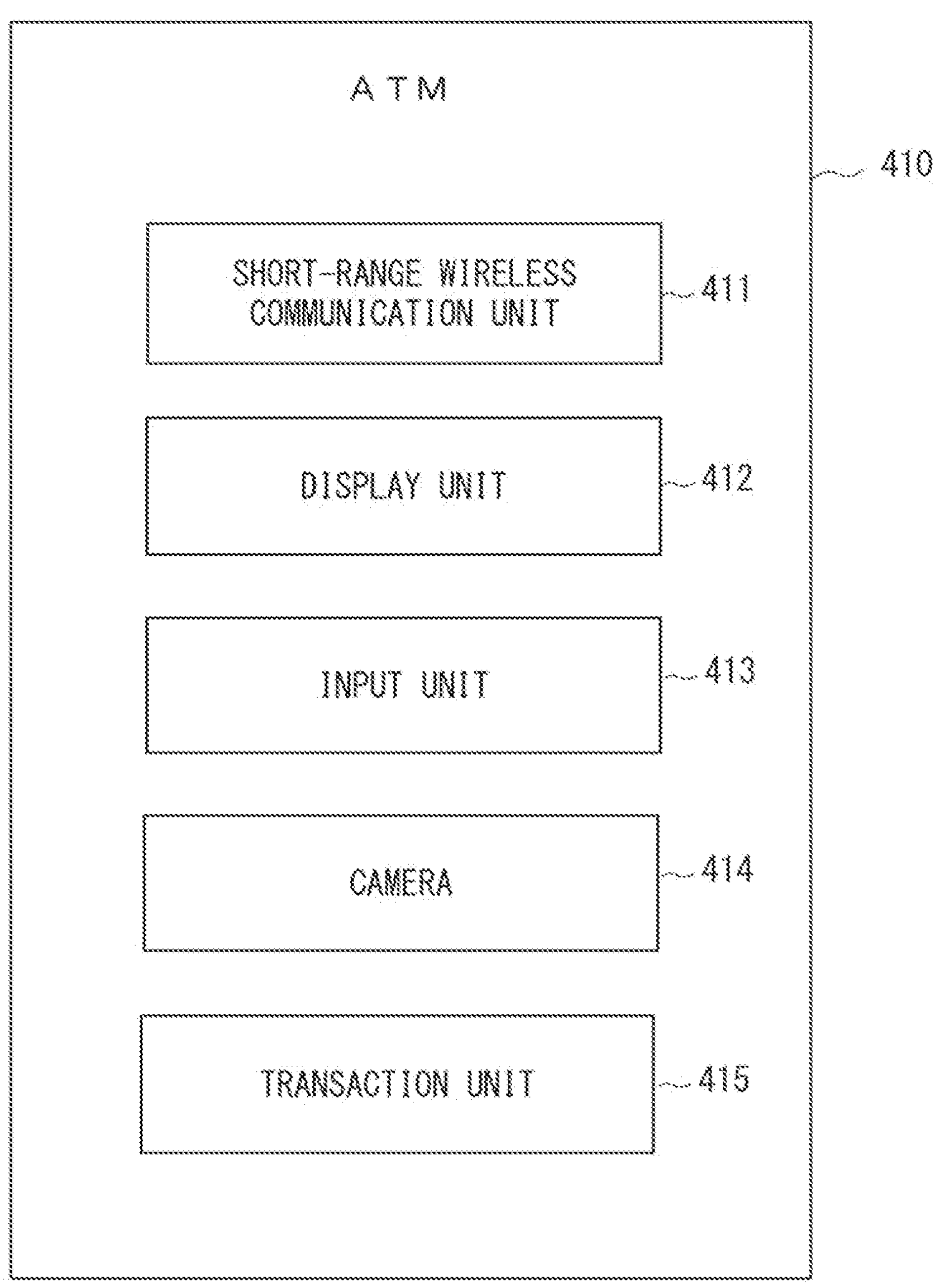
FIG. 10 is a block diagram illustrating one example of an ATM according to the present disclosure.

FIG. 10 is a block diagram illustrating one example of the ATM 410. The ATM 410 includes a short-range wireless communication unit 411, a display unit 412, an input unit 413, a camera 414, and a transaction unit 415. Hereinafter, each of the components will be described.

The short-range wireless communication unit 411 is an interface that performs terminal-to-terminal communication with another terminal or a device (for example, the terminal 110) located near the ATM 410. In this example, the short-range wireless communication unit 411 uses WiFi as a short-range wireless communication technique, but another short-range wireless communication technique such as Bluetooth may be used.

The display unit 412 includes an interface that displays information for a user of the ATM 410, such as a display or a touch panel. The input unit 413 is an input interface such as a button and a touch panel being used by a user of the ATM 410. Note that the display unit 412 and the input unit 413 may be integrated as a touch panel.

The camera 414 captures any video, and stores information about the captured video in the ATM 410. For example, the camera 414 captures a QR code displayed by the display unit 113, and thus the ATM 410 can acquire data about the QR code.

The transaction unit 415 performs transaction processing related to cryptocurrency, based on the information being input by the input unit 413 or the information being acquired by the camera 414. In an example indicated below, the transaction unit 415 performs transaction processing of exchanging cryptocurrency of the user 1 with cash.

Figure 11:
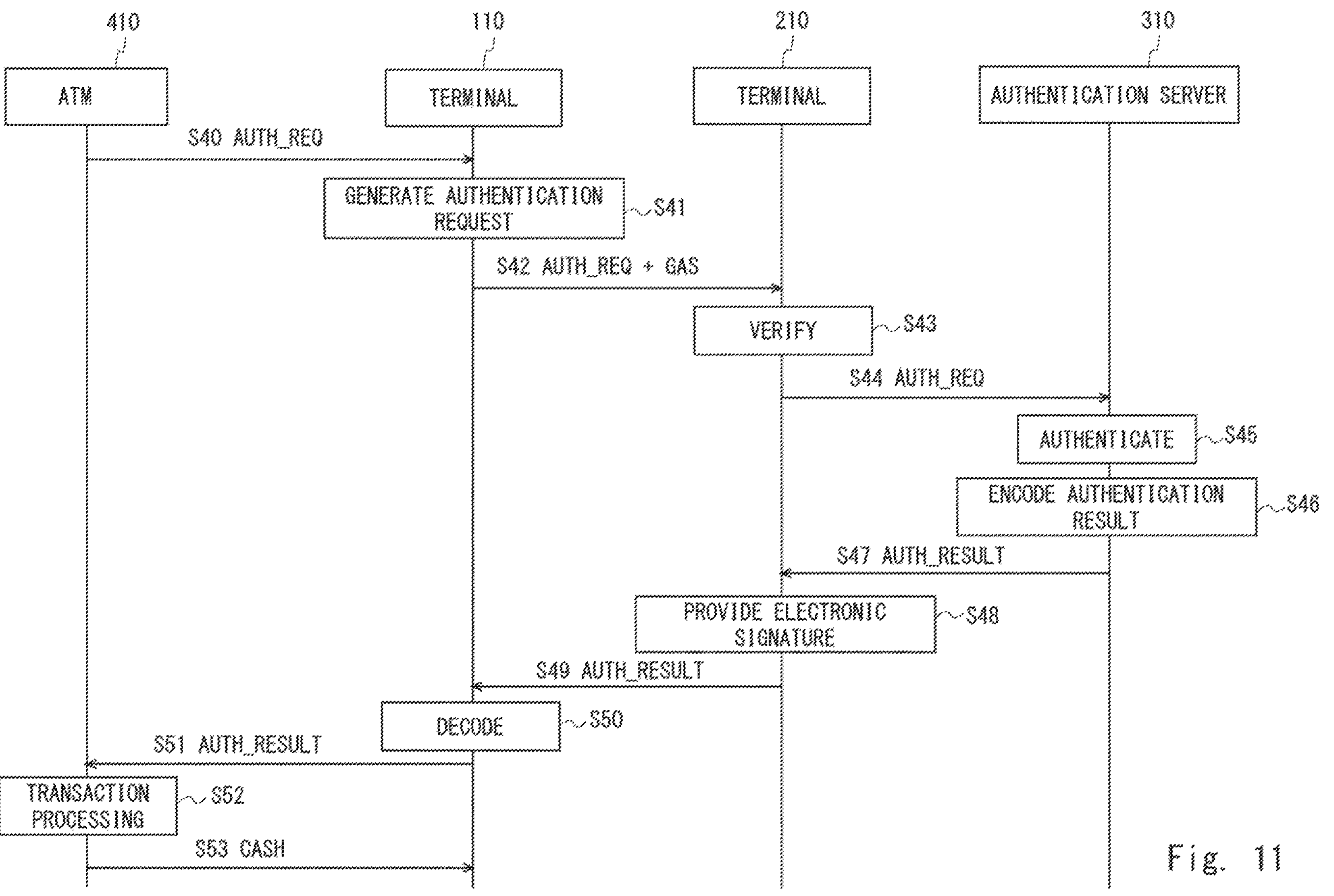
FIG. 11 is a sequence diagram illustrating a processing example of the authentication system according to the present disclosure.

FIG. 11 is a sequence diagram illustrating a processing example of the authentication system. Hereinafter, a processing example of the authentication system S2 will be described by using FIG. 11.

First, the user 1 operates the input unit 413, and thus the transaction unit 415 of the ATM 410 starts transaction processing of exchanging cryptocurrency of the user 1 with cash. Herein, the transaction unit 415 transmits, to the terminal 110 via the short-range wireless communication unit 411, an authentication request AUTH_REQ to request acquisition of an authentication result from the authentication server 310 (step S40). The short-range wireless communication unit 111 of the terminal 110 receives the authentication request AUTH_REQ.

The transaction unit 115 analyzes the received authentication request AUTH_REQ. Then, the transaction unit 115 generates an authentication request to the authentication server 310, based on the analysis result. At this time, the transaction unit 115 controls the electronic signature unit 116, and provides, by using the secret key of the terminal 110, an electronic signature to the generated authentication request. In this way, the terminal 110 generates the authentication request (step S41).

Herein, the user 1 recognizes that the moving body communication unit 112 is not connected to the authentication server 310 on the Internet, and the terminal 210 of a user 2 located near the user 1 is connected to the authentication server 310 on the Internet. Thus, the user 1 is assisted by the user 2 in an authentication procedure.

In response to the operation by the user 1, the short-range wireless communication unit 111 of the terminal 110 transmits, to the terminal 210 by using WiFi, the authentication request AUTH_REQ generated in step S41 (step S42). At this time, the user 1 sets a maximum remuneration amount intended to be paid as a price for being assisted by the user 2 in authentication processing. The remuneration amount can be changed for each piece of the authentication processing. The transaction unit 115 controls the short-range wireless communication unit 111 in such a way that information (GAS information) about the remuneration amount is also transmitted together with the authentication request AUTH_REQ to the terminal 210.

The terminal 210 acquires the authentication request AUTH_REQ and the GAS information by the short-range wireless communication unit 211. The transaction unit 215 analyzes the acquired authentication request AUTH_REQ, and thus causes the verification/decoding unit 217 to verify, by using the public key of the terminal 110, an electronic signature provided to the authentication request AUTH_REQ (step S43). In this way, the terminal 210 can confirm that the authentication request AUTH_REQ is generated by the terminal 110. Note that, as one example, the terminal 210 can acquire the public key of the terminal 110 by acquiring, from the authentication server 310, a list of public keys of a terminal being a target on which the authentication processing is performed.

After the verification of the electronic signature ends, the transaction unit 215 causes the electronic signature unit 216 to provide an electronic signature to the authentication request AUTH_REQ by using the secret key of the terminal 210. At this time, a procedure of receiving at least a part of a remuneration amount presented from the terminal 110 is automatically performed by the wallet of the storage unit 218. The remuneration amount to be received may be automatically determined by the transaction unit 215, or may be determined by the user 2. Subsequently, the transaction unit 215 causes the moving body communication unit 212 to transmit the authentication request AUTH_REQ provided with the electronic signature of the terminal 210 to the authentication server 310 (step S44).

The communication unit 311 of the authentication server 310 receives the authentication request AUTH_REQ. The authentication unit 312 authenticates the authentication request AUTH_REQ, and generates an authentication result (step S45). Next, the encoding unit 313 encodes the authentication result by using the public key of the terminal 110 in such a way that the authentication result cannot be read by a terminal other than the terminal 110 that generates the authentication request AUTH_REQ (step S46). The stamp provision unit 314 provides a time stamp to the authentication result. By providing the time stamp, reuse of the authentication result by the terminal 110 in future processing other than the authentication processing this time can be suppressed. The communication unit 311 transmits, to the terminal 210, an authentication result AUTH_RESULT being encoded and provided with the time stamp (step S47).

The moving body communication unit 212 of the terminal 210 receives the authentication result AUTH_RESULT. The transaction unit 215 analyzes the authentication result AUTH_RESULT, and determines that the authentication result AUTH_RESULT is an authentication result to the terminal 110. Then, the transaction unit 215 controls the electronic signature unit 216, and causes the electronic signature unit 216 to provide an electronic signature using the secret key of the terminal 210 to the authentication result AUTH_RESULT (step S48). Subsequently, the short-range wireless communication unit 211 transmits the authentication result AUTH_RESULT provided with the electronic signature of the terminal 210 to the terminal 110 (step S49).

The short-range wireless communication unit 111 of the terminal 110 receives the authentication result AUTH_RESULT. The transaction unit 115 analyzes the authentication result AUTH_RESULT. As a result, the transaction unit 115 controls the verification/decoding unit 117, and causes the verification/decoding unit 117 to decode the authentication result AUTH_RESULT by using the secret key of the terminal 110 (step S50). In this way, the transaction unit 115 can confirm that the authentication server 310 performs authentication on the terminal 110. Further, the transaction unit 115 causes the verification/decoding unit 117 to verify the electronic signature of the terminal 210 by using the public key of the terminal 210. Note that, as one example, the terminal 110 can acquire the public key of the terminal 210 by acquiring, from the authentication server 310, the list of public keys described above. In this way, the transaction unit 115 can confirm that the authentication result AUTH_RESULT is transmitted from the terminal 210. The short-range wireless communication unit 111 of the terminal 110 transmits the decoded authentication result AUTH_RESULT to the ATM 410 (step S51).

The short-range wireless communication unit 411 of the ATM 410 receives the authentication result AUTH_RESULT. The transaction unit 415 confirms the authentication result AUTH_RESULT, and then performs transaction processing of exchanging cryptocurrency of the user 1 with cash (step S52). Then, the short-range wireless communication unit 411 transmits data about the cash being an exchange target to the terminal 110 (step S53). In this way, the authentication processing related to cryptocurrency is performed, and the transaction processing is achieved.

In the example indicated above, communication (for example, communication using an advertisement packet) by a method such as Bluetooth instead of WiFi may be performed as short-range wireless communication between the terminal 110 and the terminal 210. In this way, even when terminal-to-terminal communication is not established in advance between the terminal 110 and the terminal 210, the terminal 110 can achieve the authentication processing via the terminal 210 by the short-range wireless communication. Further, communication by a method such as Bluetooth instead of WiFi may be performed as short-range wireless communication between the terminal 110 and the ATM 410.

Further, a QR code technique may be used for provision and acquisition of data between the terminal 110 and the terminal 210. In this case, for example, in step S42, the display unit 113 of the terminal 110 displays the authentication request AUTH_REQ and the GAS information as a QR code. The terminal 210 acquires the authentication request AUTH_REQ and the GAS information by capturing the QR code by the camera 214. Further, in step S49, the display unit 213 may display the authentication result AUTH_RESULT provided with the electronic signature of the terminal 210 as a QR code. The terminal 110 acquires the authentication result AUTH_RESULT by capturing the QR code by the camera 114. It is needless to say that the authentication request AUTH_REQ displayed as a QR code may be provided with the electronic signature of the terminal 110, and the authentication result AUTH_RESULT displayed as a QR code may be provided with the electronic signature of the terminal 210 and be encoded and provided with a time stamp by the authentication server 310.

Further, a QR code technique may also be used for provision and acquisition of data between the terminal 110 and the ATM 410. For example, in step S51, the display unit 113 of the terminal 110 may display the decoded authentication result AUTH_RESULT as a QR code. The ATM 410 acquires the authentication result AUTH_RESULT by capturing the QR code by the camera 414. It is needless to say that the authentication result AUTH_RESULT displayed as a QR code may be provided with the electronic signature of the terminal 210 and the terminal 110.

As indicated above, in the authentication system S2, the terminal 110 can present, to the terminal 210 with which a communication channel has not been established in advance, an authentication request related to cryptocurrency by using short-range wireless communication or a communication technique such as display of data and capturing of the data (for example, a QR code). In this way, even when the terminal 110 cannot be chained to a node communicated via the Internet (even when a block chain cannot be used), the terminal 110 can output an authentication request to the authentication server 310 via the terminal 210, and acquire an authentication result being a result of the authentication request. Further, since mining is not needed in an authentication process, time required for the authentication processing can be shortened.

Further, the electronic signature unit 216 of the terminal 210 can provide an electronic signature using the secret key of the terminal 210 to an authentication result, and the verification/decoding unit 117 of the terminal 110 can verify the electronic signature by using the public key of the terminal 210. In this way, the terminal 110 can confirm whether the authentication result passes through the terminal 210 and confirm presence or absence of tampering in the authentication result.

Further, when the terminal 110 transmits an authentication request to the terminal 210, the terminal 110 can provide, to the terminal 210, information about remuneration being set by the terminal 110. Then, when the terminal 210 provides an electronic signature to the authentication request by the electronic signature unit 216, at least a part of the remuneration can be received by the wallet of the terminal 210. In this way, a user of the terminal 210 can acquire the remuneration, and thus assistance by the terminal 210 in the authentication processing can be promoted.

Further, the terminal 110 can provide an electronic signature to an authentication result, and then provide the authentication result to the ATM 410. In this way, the terminal 110 can perform a transaction of cryptocurrency with the ATM 410.

Further, the terminal 210 can provide, by using the secret key of the terminal 210, an electronic signature to an authentication request transmitted to the authentication server 310. In this way, the authentication server 310 can confirm presence or absence of tampering in the authentication request.

Further, the authentication server 310 can generate an authentication result for an authentication request, encode the generated authentication result by using the public key of the terminal 110, and also provide a time stamp related to the generation of the authentication result to the authentication result, and transmit the authentication result to the terminal 210. In this way, the authentication result being read by a terminal other than the terminal 110 and reuse of the authentication result by the terminal 110 can be suppressed.

Note that the present disclosure is not limited to the example embodiments described above, and may be appropriately modified without departing from the scope of the present disclosure. For example, in the second example embodiment, authentication processing in cryptocurrency is described, but a target of the authentication processing is not limited to this.

In the description above, it is described that the device according to this disclosure is formed of hardware, but this disclosure is not limited to this. The device according to this disclosure can also achieve processing (step) of the device such as the terminal, the authentication server, and the ATM described in the example embodiments described above by causing a processor in a computer to execute a computer program.

Figure 12:
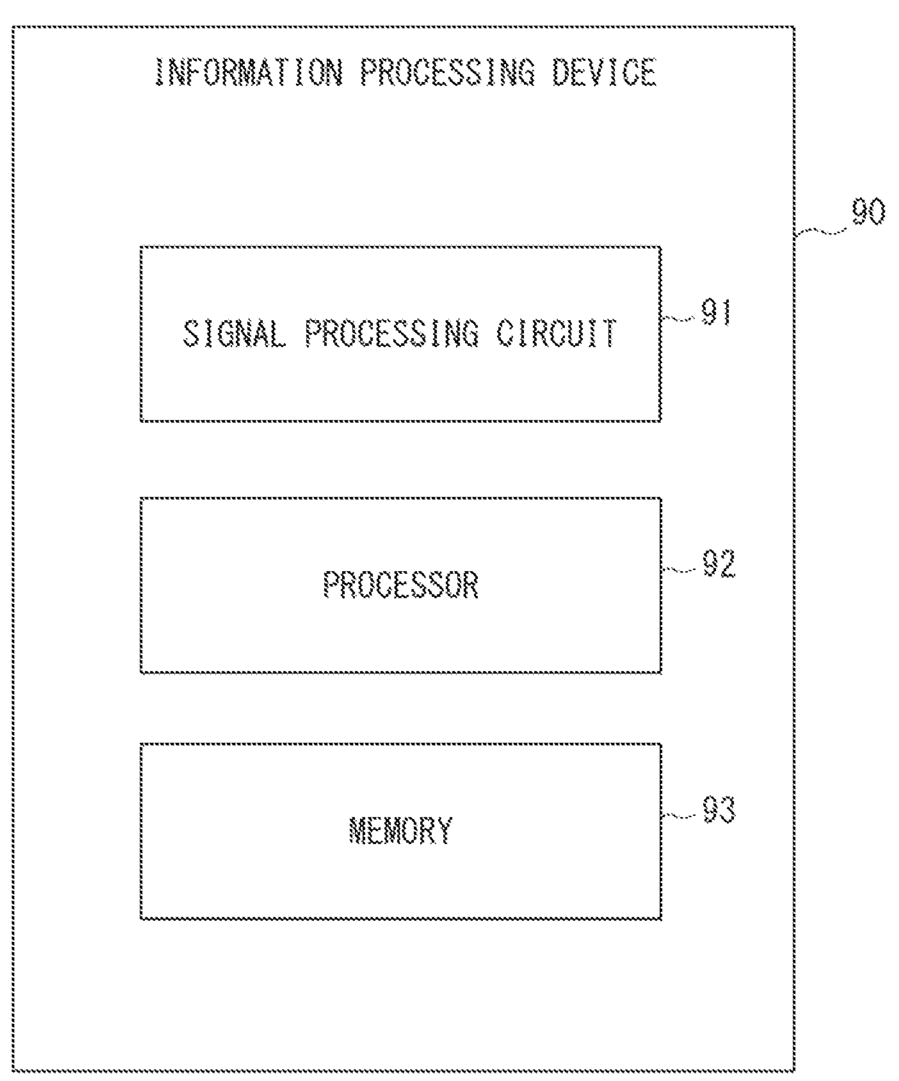
FIG. 12 is a block diagram illustrating a hardware configuration example of an information processing device (signal processing device) in which processing according to the present disclosure is performed.

FIG. 12 is a block diagram illustrating a hardware configuration example of an information processing device (signal processing device) in which the processing according to the present disclosure indicated above is performed. With reference to FIG. 12, the information processing device 90 includes a signal processing circuit 91, a processor 92, and a memory 93.

The signal processing circuit 91 is a circuit for processing a signal according to control of the processor 92. Note that the signal processing circuit 91 may include a communication circuit that receives a signal from a transmission device.

The processor 92 performs the processing of the device described in the example embodiments described above by reading software (computer program) from the memory 93 and executing the software. As one example of the processor 92, one of a central processing unit (CPU), a micro processing unit (MPU), a field-programmable gate array (FPGA), a demand-side platform (DSP), and an application specific integrated circuit (ASIC) may be used, or a plurality of them may be simultaneously used.

The memory 93 is formed of a volatile memory, a non-volatile memory, or a combination thereof. A plurality of the memories 93 may be provided instead of one. Note that the volatile memory may be, for example, a random access memory (RAM) such as a dynamic random access memory (DRAM) and a static random access memory (SRAM). The non-volatile memory may be, for example, a random only memory (ROM) such as a programmable random only memory (PROM) and an erasable programmable read only memory (EPROM), a flash memory, or a solid state drive (SSD).

The memory 93 is used for storing one or more commands. Herein, one or more commands are stored as a software module group in the memory 93. The processor 92 can perform the processing described in the example embodiments described above by reading the software module group from the memory 93 and executing the software module group.

Note that the memory 93 may include a component built in the processor 92 in addition to a component provided outside the processor 92. Further, the memory 93 may include a storage disposed away from a processor forming the processor 92. In this case, the processor 92 can access the memory 93 via an input/output (I/O) interface.

As described above, one or a plurality of processors included in each device in the example embodiments described above execute one or a plurality of programs including a command group for causing a computer to perform an algorithm described by using the drawings. With the processing, the signal processing method described in each of the example embodiments can be achieved.

When the program is read by a computer, the program includes a command group (or software codes) for causing the computer to perform one or more of the functions described in the example embodiments. The program may be stored in a non-transitory computer-readable medium or a tangible storage medium. Examples of the computer-readable medium or the tangible storage medium include a random-access memory (RAM), a read-only memory (ROM), a flash memory, a solid-state drive (SSD), or other memory technique, a CD-ROM, a digital versatile disk (DVD), a Blu-ray (registered trademark) disc, or other optical disc storage, a magnetic cassette, a magnetic tape, a magnetic disc storage, or other magnetic storage device, which are not limited thereto. The program may be transmitted on a transitory computer-readable medium or a communication medium. Examples of the transitory computer-readable medium or the communication medium include electrical, optical, acoustic, or other form of propagation signals, which are not limited thereto.

The whole or part of the exemplary embodiments disclosed above can be described as, but not limited to, the following supplementary notes.

Supplementary Note 1

A terminal including:

an electronic signature unit configured to provide a first electronic signature to data by using a secret key of an own terminal;

an provision unit configured to provide, as an authentication request to another terminal, the data provided with the first electronic signature;

an acquisition unit configured to acquire, from the another terminal, an authentication result of an authentication server for the authentication request, the authentication result being encoded by using a public key of the own terminal; and a data processing unit configured to decode the authentication result by using the secret key of the own terminal.

Supplementary Note 2

The terminal according to supplementary note 1, wherein the acquisition unit acquires the authentication result provided with a second electronic signature using a secret key of the another terminal, and the data processing unit verifies the second electronic signature by using a public key of the another terminal.

Supplementary Note 3

The terminal according to supplementary note 1 or 2, wherein the provision unit is a wireless communication unit configured to perform short-range wireless communication, or a display unit configured to display the data, and the acquisition unit is a wireless communication unit configured to perform short-range wireless communication, or a camera.

Supplementary Note 4

The terminal according to supplementary note 1 or 2, wherein the provision unit provides, to the another terminal, the authentication request and information about remuneration being set by the terminal.

Supplementary Note 5

The terminal according to supplementary note 1, wherein the authentication request is an authentication request related to a transaction of cryptocurrency, the electronic signature unit provides, by using the secret key of the own terminal, a third electronic signature to the authentication result verified by the data processing unit, and the provision unit provides the authentication result provided with the third electronic signature by the electronic signature unit to a transaction device of cryptocurrency.

Supplementary Note 6

A terminal including:
an acquisition unit configured to acquire data provided with a first electronic signature by another terminal;
a verification unit configured to verify the first electronic signature by using a public key of the another terminal;
a transmission/reception unit configured to transmit the verified data as an authentication request to an authentication server, and receive an authentication result for the authentication request from the authentication server;
an electronic signature unit configured to provide a second electronic signature to the authentication result by using a secret key of an own terminal; and
a provision unit configured to provide the authentication result provided with the second electronic signature to the another terminal.

Supplementary Note 7

The terminal according to supplementary note 6, wherein
the acquisition unit is a wireless communication unit configured to perform short-range wireless communication, or a camera, and
the provision unit is a wireless communication unit configured to perform short-range wireless communication, or a display unit configured to display the data.

Supplementary Note 8

The terminal according to supplementary note 6 or 7, wherein
the electronic signature unit provides, by using the secret key of the own terminal, a third electronic signature to the authentication request transmitted to the authentication server, and
the transmission/reception unit transmits the authentication request provided with the third electronic signature to the authentication server.

Supplementary Note 9

The terminal according to supplementary note 8, wherein
the acquisition unit acquires, from the another terminal, the data provided with the first electronic signature and information about remuneration being set by the another terminal, and
a procedure of receiving at least a part of the remuneration by a wallet of the own terminal is performed when the electronic signature unit provides the third electronic signature.

Supplementary Note 10

An authentication system including:
a first terminal; and
a second terminal, wherein
the first terminal provides a first electronic signature to data by using a secret key of the first terminal,
the second terminal acquires the data provided with the first electronic signature, verifies the first electronic signature by using a public key of the first terminal, and transmits the verified data as an authentication request to an authentication server,
the second terminal receives, from the authentication server, an authentication result for the authentication request, the authentication result being encoded by using the public key of the first terminal, and
the first terminal acquires the authentication result from the second terminal, and decodes the acquired authentication result by using the secret key of the first terminal.

Supplementary Note 11

The authentication system according to supplementary note 10, wherein
the second terminal provides a second electronic signature to the authentication result by using a secret key of the second terminal, and
the first terminal acquires the authentication result provided with the second electronic signature from the second terminal, and verifies the second electronic signature by using a public key of the second terminal.

Supplementary Note 12

The authentication system according to supplementary note 10 or 11, further including the authentication server configured to generate the authentication result for the authentication request, encode the generated authentication result by using the public key of the first terminal, also provide a time stamp related to generation of the authentication result to the authentication result, and transmit the authentication result to the second terminal.

Supplementary Note 13

The authentication system according to supplementary note 10 or 11, wherein
the second terminal acquires the data from the first terminal by any of short-range wireless communication and reading of a code, and
the first terminal acquires the authentication result from the second terminal by any of short-range wireless communication and reading of a code.

Supplementary Note 14

The authentication system according to supplementary note 10 or 11, wherein the second terminal provides, by using the secret key of the second terminal, a third electronic signature to the authentication request transmitted to the authentication server, and transmits the authentication request provided with the third electronic signature to the authentication server.

Supplementary Note 15

The authentication system according to supplementary note 14, wherein
the second terminal acquires, from the first terminal, the data provided with the first electronic signature and information about remuneration being set by the first terminal, and a procedure of receiving at least a part of the remuneration by a wallet of the second terminal is performed when the second terminal provides the third electronic signature.

Supplementary Note 16

The authentication system according to supplementary note 10 or 11, wherein the authentication request is an authentication request related to a transaction of cryptocurrency, and the first terminal provides, by using the secret key of the first terminal, a fourth electronic signature to the verified authentication result, and thus generates data to be acquired by a transaction device of cryptocurrency.

Supplementary Note 17

An authentication method including, executed by a terminal:

providing a first electronic signature to data by using a secret key of an own terminal;

providing, as an authentication request to another terminal, the data provided with the first electronic signature;

acquiring, from the another terminal, an authentication result of an authentication server for the authentication request, the authentication result being encoded by using a public key of the own terminal; and decoding the authentication result by using the secret key of the own terminal.

Supplementary Note 18

An authentication method including, executed by a terminal:

acquiring data provided with a first electronic signature by another terminal;

verifying the first electronic signature by using a public key of the another terminal;

transmitting the verified data as an authentication request to an authentication server;

receiving an authentication result for the authentication request from the authentication server;

providing a second electronic signature to the authentication result by using a secret key of an own terminal; and providing the authentication result provided with the second electronic signature to the another terminal.

Supplementary Note 19

An authentication method executed by an authentication system, wherein a first terminal provides a first electronic signature to data by using a secret key of the first terminal, a second terminal acquires the data provided with the first electronic signature, verifies the first electronic signature by using a public key of the first terminal, and transmits the verified data as an authentication request to an authentication server, the second terminal receives, from the authentication server, an authentication result for the authentication request, the authentication result being encoded by using the public key of the first terminal, and the first terminal acquires the authentication result from the second terminal, and decodes the acquired authentication result by using the secret key of the first terminal.

Supplementary Note 20

A program causing a computer to execute:

providing a first electronic signature to data by using a secret key of an own terminal;

providing, as an authentication request to another terminal, the data provided with the first electronic signature;

acquiring, from the another terminal, an authentication result of an authentication server for the authentication request, the authentication result being encoded by using a public key of the own terminal; and decoding the authentication result by using the secret key of the own terminal.

Supplementary Note 21

A program causing a computer to execute:

acquiring data provided with a first electronic signature by another terminal;

verifying the first electronic signature by using a public key of the another terminal;

transmitting the verified data as an authentication request to an authentication server;

receiving an authentication result for the authentication request from the authentication server;

providing a second electronic signature to the authentication result by using a secret key of an own terminal; and providing the authentication result provided with the second electronic signature to the another terminal.

The first, second, third and fourth embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A terminal comprising:

at least one memory configured to store instructions; and at least one processor configured to execute the instructions to:

provide a first electronic signature to data by using a secret key of an own terminal if an authentication server cannot be accessed via a network by the own terminal, provide, as an authentication request to another terminal, the data provided with the first electronic signature by communicating with the another terminal or displaying a code that the another terminal reads with a camera, acquire, from the another terminal, an authentication result of the authentication server for the authentication request by communicating with the another terminal or reading a code displayed by the another terminal with its camera, the authentication result being encoded by using a public key of the own terminal, and decode the authentication result by using the secret key of the own terminal.

2. The terminal according to claim 1, wherein the at least one processor is further configured to execute the instructions to:

acquire the authentication result provided with a second electronic signature using a secret key of the another terminal, and verify the second electronic signature by using a public key of the another terminal.

3. The terminal according to claim 1, wherein the at least one processor is further configured to execute the instructions to display the data as a two-dimensional code, and thus provide the data as an authentication request to the another terminal.

4. The terminal according to claim 1, wherein the at least one processor is further configured to execute the instructions to provide, to the another terminal, the authentication request and information about remuneration being set by the terminal.

5. The terminal according to claim 1, wherein the authentication request is an authentication request related to a transaction of cryptocurrency, and wherein the at least one processor is further configured to execute the instructions to:

provide, by using the secret key of the own terminal, a third electronic signature to the authentication result, and provide the authentication result provided with the third electronic signature to a transaction device of cryptocurrency.

6. A terminal comprising:

at least one memory configured to store instructions; and at least one processor configured to execute the instructions to:

if an authentication server cannot be accessed via a network by an own terminal, acquire data provided with a first electronic signature by another terminal by communicating with the another terminal or reading a code displayed by the another terminal with its camera, verify the first electronic signature by using a public key of the another terminal, transmit the verified first electronic signature as an authentication request to an authentication server, receive an authentication result for the authentication request from the authentication server, provide a second electronic signature to the authentication result by using the secret key of the own terminal, and provide the authentication result provided with the second electronic signature to the another terminal by communicating with the another terminal or displaying a code that the another terminal reads with a camera.

7. The terminal according to claim 6, wherein the at least one processor is further configured to execute the instructions to display the data as a two-dimensional code, and thus provide the authentication result to the another terminal.

8. The terminal according to claim 6, wherein the at least one processor is further configured to execute the instructions to:

further provide, by using the secret key of the own terminal, a third electronic signature to the authentication request transmitted to the authentication server, and transmit the authentication request provided with the third electronic signature to the authentication server.

9. The terminal according to claim 8, wherein the at least one processor is further configured to execute the instructions to:

further acquire, from the another terminal, the data provided with the first electronic signature and information about remuneration being set by the another terminal, and a procedure of receiving at least a part of the remuneration by a wallet of the own terminal is performed when the at least one processor provides the third electronic signature.

10. An authentication method comprising, executed by a terminal:

providing a first electronic signature to data by using a secret key of an own terminal if an authentication server cannot be accessed via a network by the own terminal;

providing, as an authentication request to another terminal, the data provided with the first electronic signature by communicating with the another terminal or displaying a code that the another terminal reads with a camera;

acquiring, from the another terminal, an authentication result of an authentication server for the authentication request by communicating with the another terminal or reading a code displayed by the another terminal with its camera, the authentication result being encoded by using a public key of the own terminal; and decoding the authentication result by using the secret key of the own terminal.

11. The authentication method according to claim 10, further comprising:

acquiring the authentication result provided with a second electronic signature using a secret key of the another terminal, and verifying the second electronic signature by using a public key of the another terminal.

12. The authentication method according to claim 10, further comprising:

displaying the data as a two-dimensional code, and thus providing the data as an authentication request to the another terminal.

13. The authentication method according to claim 10, further comprising:

providing, to the another terminal, the authentication request and information about remuneration being set by the terminal.

14. The authentication method according to claim 10, wherein the authentication request is an authentication request related to a transaction of cryptocurrency, and the authentication method further comprises:

further providing, by using the secret key of the own terminal, a third electronic signature to the authentication result, and providing the authentication result provided with the third electronic signature to a transaction device of cryptocurrency.

15. The terminal according to claim 1, wherein the at least one processor is further configured to execute the instructions to convert the data into a hash value by a hash function, and encode the data using the secret key.

16. The terminal according to claim 6, wherein the at least one processor is further configured to execute the instructions to convert the data into a hash value by a hash function, and encode the data using a secret key of an own terminal.

17. The authentication method of claim 10, further comprising converting the data into a hash value by a hash function, and encoding the data using the secret key.

* * * * *